United States Patent
Shoemake et al.

(10) Patent No.: US 8,222,167 B2
(45) Date of Patent: Jul. 17, 2012

(54) UREA-FORMALDEHYDE RESIN BINDERS CONTAINING ACRYLIC BI-MODAL MOLECULAR WEIGHT SOLUTION POLYMER

(75) Inventors: Kelly Shoemake, Atlanta, GA (US); Norwin Wolff, Marshfield Hills, MA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 570 days.

(21) Appl. No.: 11/640,499

(22) Filed: Dec. 18, 2006
(Under 37 CFR 1.47)

(65) Prior Publication Data
US 2007/0173155 A1 Jul. 26, 2007

Related U.S. Application Data

(60) Provisional application No. 60/751,653, filed on Dec. 20, 2005.

(51) Int. Cl.
*B32B 27/02* (2006.01)

(52) U.S. Cl. ........ 442/163; 442/180; 442/164; 442/172; 442/414; 525/154; 428/292

(58) Field of Classification Search .................. 442/164, 442/172, 180, 414; 525/154; 428/292
See application file for complete search history.

(56) References Cited

U.S. PATENT DOCUMENTS

| | | | |
|---|---|---|---|
| 4,258,098 A | 3/1981 | Bondoc et al. | |
| 4,560,612 A | 12/1985 | Yau | |
| 4,917,764 A | 4/1990 | Lalwani et al. | |
| 5,362,842 A | 11/1994 | Graves et al. | |
| 5,364,736 A * | 11/1994 | Eramo et al. | 430/280.1 |
| 5,389,716 A | 2/1995 | Graves | |
| 5,914,365 A | 6/1999 | Chang et al. | |
| 5,990,228 A * | 11/1999 | Eichman et al. | 524/529 |
| 6,084,021 A | 7/2000 | Chang et al. | |
| 6,642,299 B2 | 11/2003 | Wertz et al. | |

* cited by examiner

*Primary Examiner* — Randy Gulakowski
*Assistant Examiner* — Shane Fang
(74) *Attorney, Agent, or Firm* — Michael S. Kerns; Ram W. Sabnis

(57) ABSTRACT

An aqueous binder composition for use in making fiber mats comprising as a major component a thermosetting urea-formaldehyde resin and as a minor component a water-soluble additive is at least one styrene/acrylate solution polymer having a bi-modal molecular weight and comprising a first molecular weight species and a second molecular weight species.

27 Claims, No Drawings

UREA-FORMALDEHYDE RESIN BINDERS CONTAINING ACRYLIC BI-MODAL MOLECULAR WEIGHT SOLUTION POLYMER

This application claims priority to U.S. provisional application Ser. No. 60/751,653, filed Dec. 20, 2005, and hereby incorporated by reference in its entirety.

FIELD OF THE INVENTION

The invention relates to a modified, thermosetting urea-formaldehyde resin composition useful as a binder for making fiber mats, to fiber mats prepared using the modified urea-formaldehyde resin as a binder, and to a process of preparing mats using the binder.

BACKGROUND OF THE INVENTION

Glass fiber mats and fiber mats made from other synthetic fibers are finding increasing application in the building materials industry, as for example, in composite flooring, in asphalt roofing shingles, or siding, replacing similar sheets traditionally made using wood, cellulose or asbestos fibers.

Fiber mats, and especially glass fiber mats, usually are made commercially by a wet-laid process, which is carried out on what can be viewed as modified paper-making machinery. Descriptions of the wet-laid process may be found in a number of U.S. patents, including U.S. Pat. Nos. 2,906,660, 3,012,929, 3,050,427, 3,103,461, 3,228,825, 3,760,458, 3,766,003, 3,838,995 and 3,905,067. In general, the wet-laid process for making glass fiber mats comprises first forming an aqueous slurry of short-length glass fibers (referred to in the art as "white water") under agitation in a mixing tank, then feeding the slurry onto a moving screen on which the fibers enmesh themselves into a freshly prepared wet glass fiber mat, while excess water is separated therefrom.

Unlike natural fibers such as cellulose or asbestos, glass fibers do not disperse well in water. To overcome this problem, it has been the industry practice to provide suspending aids for the glass fibers. Such suspending aids or dispersants usually are materials which increase the viscosity of the aqueous medium. Suitable dispersants conventionally employed in the art include polyacrylamides, hydroxyethyl cellulose, ethoxylated amines and amine oxides. Other additives such as surfactants, lubricants, biocides and defoamers also have conventionally been added to the white water. Such agents, for example, further aid the wettability and dispersion of the glass fibers. Experience has shown that such additives also often influence the strength of the wet glass fiber mat.

The fiber slurry deposited on the moving screen or cylinder is processed into a sheet-like fiber mat by the removal of water, usually by suction and/or vacuum devices, and is followed by the application of a polymeric binder to the mat. In the manufacture of glass fiber mats, a high degree of flexibility and tear strength is desired in the finished mat in addition to primary dry tensile and wet tensile properties. A binder composition is therefore used to hold the glass fiber mat together. The binder composition is impregnated directly into the fibrous mat and set or cured immediately thereafter to provide the desired mat integrity. The binder composition is applied to the mat by soaking the mat in an excess of binder solution or suspension, or by impregnating the mat surface by means of a binder applicator, for example, by roller or spray. The primary binder applicator for glass mat machines has been the falling film curtain coater. Suction devices often are also utilized for further removal of water and excess binder and to ensure a thorough application of binder through the glass fiber mat. A widely used binder is based on a urea-formaldehyde resin commonly fortified with an emulsion polymer. UF resins have been employed because they are relatively inexpensive. In addition to mat strength properties which the binder composition imparts to the ultimately cured mat, the binder also functions to improve the strength of the uncured, wet-laid mat as it is transported from its initial formation into and through the curing oven. Such incipient pre-cured strength is needed to avoid process delays and shutdowns caused by breaks in the endless mat.

Thus-incorporated binder is thermally cured, typically in an oven at elevated temperatures. Generally, a temperature in the range of about 200 to 250° C. is used during curing. Normally, this heat treatment alone will effect curing of the binder. Catalytic curing, such as is accomplished with addition of an acid catalyst (for example, ammonium chloride or p-toluene sulfonic acid), generally is a less desirable, though an optional, alternative.

Because glass fiber mats made with a binder consisting essentially of a UF resin often are brittle, or because the strength properties of the mats may deteriorate appreciably subsequent to their preparation, especially when the mats are subjected to wet conditions, UF resin binders have commonly been modified by formulating the UF resin with cross-linkers and various catalyst systems or by fortifying the UF resin with a large amount of latex (emulsion) polymer, usually a polyvinyl acetate, vinyl acrylic or styrene-butadiene. Typically, glass mat UF binders are modified with 8-12% latex. Certain latexes can provide increased wet tensile strength and tear strength. The use of styrene-butadiene latex-modified, urea-formaldehyde resin compositions as a binder for glass fiber mats is disclosed, for example, in U.S. Pat. Nos. 4,258,098; 4,560,612 and 4,917,764.

U.S. Pat. Nos. 5,914,365 and U.S. Pat. No. 6,642,299 are directed to a binder formulation for making glass mats. U.S. Pat. No. 5,914,365 describes an aqueous urea-formaldehyde (UF) fiber mat adhesive binder formulation modified by the addition of a minor amount of a water soluble, styrene-maleic anhydride (SMA) copolymer. The addition of SMA to the primarily UF adhesive resin is known to improve both the wet and dry tensile properties of the mat. U.S. Pat. No. 6,642,299 describes adding a water-soluble additive selected from the group consisting of (1) a polymer of styrene acrylic acid or styrene acrylate, (2) a polymer of styrene, maleic anhydride, and an acrylic-acid or acrylate and (3) a physical mixture of a styrene acrylic acid or styrene-acrylate copolymer to SMA.

BRIEF SUMMARY OF THE INVENTION

The invention is directed to the addition of an effective amount of a styrene/acrylate solution polymer having a bi-modal molecular weight to a thermosetting urea-formaldehyde (UF) resin-based binder and to using the modified binder to prepare fiber mats. The binder modified with the styrene/acrylate solution polymer having a bi-modal molecular weight of the present invention produces fiber mats having good mat properties including mat tear strength and dry tensile strength. Unexpectedly good properties were obtained with the addition of very low levels (0.5-5%) of bi-modal solution polymer to a UF resin binder.

In a first embodiment the present invention is directed to an aqueous binder composition for use in making fiber mats comprises as a major component a thermosetting urea-formaldehyde resin and as a minor component a water-soluble additive comprising at least one styrene/acrylate solution polymer having a bi-modal molecular weight and comprising a first molecular weight species and a second molecular weight species. The first molecular weight species has a molecular weight of about 1000-100,000 daltons and an acid number of from about 50 to about 780. The second molecular weight species has a molecular weight of greater than about 100,000 daltons.

In a further embodiment, the invention is directed to a method of making a fiber mat comprising dispersing fibers in an aqueous medium to form a slurry, forming the slurry into a wet fiber mat, applying an aqueous binder composition to said wet fiber mat, and curing the binder composition at an elevated temperature, the aqueous binder comprising as a major component a thermosetting urea-formaldehyde resin and as a minor component a water-soluble additive comprising at least one styrene/acrylate solution polymer having a bi-modal molecular weight and comprising a first molecular weight species and a second molecular weight species.

In a further embodiment the invention is directed to a fiber mat having good tensile properties comprising said fibers bound together with a cured binder, said binder comprising as a major component a thermosetting urea-formaldehyde resin and as a minor component a water-soluble additive comprising at least one styrene/acrylate solution polymer having a bi-modal molecular weight and comprising a first molecular weight species and a second molecular weight species.

In a further embodiment, the invention is directed to a method of making a fiber mat comprising: dispersing fibers in an aqueous medium to form a slurry, forming the slurry into a wet fiber mat, applying an aqueous binder composition comprising as a major component a thermosetting urea-formaldehyde resin and as a minor component a water-soluble an additive comprising as a major component a thermosetting urea-formaldehyde resin and as a minor component a water-soluble additive containing at least one styrene/acrylate solution polymer having a bi-modal molecular weight and comprising a first molecular weight species and a second molecular weight species to said wet fiber mat, and curing the binder composition at an elevated temperature, wherein the binder, before curing, contains about 0.1 to about 10 wt % solids based on total urea-formaldehyde resin and additive solids, and wherein said elevated temperature is from about 135° C. to about 300° C.

DETAILED DESCRIPTION OF THE INVENTION

Prior attempts at using other solution polymers produced glass mats having poor properties. It was unexpected that glass mats having properties at least as good as UF resins modified with SMA were obtained using very low levels (0.5-5%) of the solution polymers having bi-modal molecular weight in accordance with the instant invention.

The invention is directed to the addition of an effective amount of a styrene/acrylate solution polymer having a bi-modal molecular weight to a thermosetting urea-formaldehyde (UF) resin-based binder and to using the modified binder to prepare fiber mats. The binder modified with the styrene/acrylate solution polymer having a bi-modal molecular weight of the present invention produces fiber mats having good mat properties including mat tear strength and dry tensile strength The styrene/acrylate polymer solution contains first and second molecular weight species polymerized in situ. The first species has a molecular weight of about 1000-100,000 daltons, for example 3000 to 7000 daltons, with an acid number of about 50 to 780, for example 200 to 400. The second species has a molecular weight greater than 100,000 daltons (for example greater than 100,000 to 3 to 5 million).

The first and/or second species can contain up to 50% hydroxyl groups, for example about 10 to about 50%.

The ratio of first species (low molecular weight) to the second species (high molecular weight) varies from 95:5 to 5:95, for example 80:20 to 20:80, or 50:50 to 70:30. In one embodiment, the ratio of first species to second species is about 60:40. The ratio can be varied depending on desired performance characteristics.

Any suitable acrylic acid or acrylate may be used in the solution polymer such as, but not limited to, methyl methacrylate, butyl acrylate, or butyl methacrylate. For instance, the acrylate polymer may have the following structure:

Wherein $R_1$ is H or $-CH_3$; $R_2$ is $-H$ or an optionally substituted ester moiety wherein the substitution may be one or more functional groups. Preferably, the acrylate is methyl methacrylate (MMA).

Alternatively, the acrylate polymer may be an acrylonitrile or amide having the following formula:

Wherein $R_3$ and $R_4$ are $-H$ or longer chain materials such as an alkyl or alkanol, for example N-methylol.

The thermosetting urea-formaldehyde (UF) resin used as the major component of the binder composition can be prepared from urea and formaldehyde monomers or from UF precondensates in manners well known to those of skill in the art.

Skilled practitioners recognize that the urea and formaldehyde reactants are commercially available in many forms. Any form which can react with the other reactants and which does not introduce extraneous moieties deleterious to the desired reaction and reaction product can be used in the preparation of urea-formaldehyde resins useful in the invention. One particularly useful class of UF resins for use in preparing binders in accordance with the present invention is disclosed in U.S. Pat. No. 5,362,842, the disclosure of which is incorporated herein by reference.

Formaldehyde for making a suitable UF resin is available in many forms. Paraform (solid, polymerized formaldehyde) and formalin solutions (aqueous solutions of formaldehyde, sometimes with methanol, in 37 percent, 44 percent, or 50 percent formaldehyde concentrations) are commonly used forms. Formaldehyde also is available as a gas. Any of these forms is suitable for use in preparing a UF resin in the practice of the invention. Typically, formalin solutions are preferred as the formaldehyde source.

Similarly, urea is available in many forms. Solid urea, such as prill, and urea solutions, typically aqueous solutions, are commonly available. Further, urea may be combined with another moiety, most typically formaldehyde and urea-formaldehyde adducts, often in aqueous solution. Any form of urea or urea in combination with formaldehyde is suitable for use in the practice of the invention. Both urea prill and combined urea-formaldehyde products are preferred, such as Urea-Formaldehyde Concentrate or UFC 85. These types of products are disclosed in, for example, U.S. Pat. Nos. 5,362,842 and 5,389,716.

Any of the wide variety of procedures used for reacting the principal urea and formaldehyde components to form a UF thermosetting resin composition also can be used, such as staged monomer addition, staged catalyst addition, pH control, amine modification and the like. Generally, the urea and formaldehyde are reacted at a mole ratio of formaldehyde to urea in the range of about 1.1:1 to 4:1, and more often at an F:U mole ratio of between about 1.7:1 to 3.2:1. Generally, the UF resin is highly water dilutable, if not water soluble.

Many thermosetting urea-formaldehyde resins that may be used in the practice of this invention are commercially available. Urea-formaldehyde resins such as the types sold by Georgia Pacific Resins, Inc. for glass fiber mat applications, those sold by Hexion Specialty Chemicals, and by Dynea Corporation may be used. These resins are prepared in accordance with the previous teachings and contain reactive methylol groups which, upon curing, form methylene or ether linkages. Such methylol-containing adducts may include N,N-dimethylol, dihydroxymethylolethylene; N,N-bis(methoxymethyl), N,N-dimethylolpropylene; 5,5-dimethyl-N,N-dimethylol-ethylene; N,N-dimethylolethylene; and the like.

Urea-formaldehyde resins useful in the practice of the invention generally contain 45 to 70%, and preferably, 55 to 65% non-volatiles, generally have a viscosity of 50 to 600 cps, preferably 150 to 400 cps, normally exhibit a pH of 7.0 to 9.0, preferably 7.5 to 8.5, and often have a free formaldehyde level of not more than about 3%, typically less than 1%, more typically about 0.5% and a water dilutability of 1:1 to 100:1, preferably 5:1 and above.

The reactants for making the UF resin may also include a small amount of resin modifiers such as ammonia, alkanolamines, or polyamines, such as an alkyl primary diamine, e.g., ethylenediamine (EDA). Additional modifiers, such as melamine, ethylene ureas, and primary, secondary and tertiary amines, for example, dicyanodiamide, can also be incorporated into UF resins used in the invention. Concentrations of these modifiers in the reaction mixture often will vary from 0.05 to 20.0% by weight of the UF resin solids. These types of modifiers promote hydrolysis resistance, polymer flexibility and lower formaldehyde emissions in the cured resin. Further urea additions for purposes of scavenging formaldehyde or as a diluent also may be used.

Unneutralized styrene/acrylate copolymers, used in accordance with the present invention, are generally water-insoluble and may be neutralized with an alkaline substance, such as a hydroxide, like sodium hydroxide, potassium hydroxide, ammonium hydroxide, lithium hydroxide, or cesium hydroxide; a carbonate, like sodium carbonate, potassium carbonate or ammonium carbonate; ammonia or an amine. Although it generally is desirable to use the neutralizing agent in an amount sufficient to neutralize 100 mole % of the copolymer, in the practice of the invention it is only necessary to neutralize the copolymer sufficiently to obtain water solubility. The level of addition of any particular neutralizing agent to obtain an acceptable degree of water solubility is well within the normal skill in the art.

In order to insure suitable storage stability of the modified binder composition and proper performance during use of the binder composition, it is important that the pH of the aqueous mixture of the UF and adduct components end up within the range of about 6 to 9, and more preferably between about 7 and 8.5. Too low a pH causes premature curing of the UF resin and incompatibility of the constituents; too high a pH retards curing of the composition on heating during use.

The additive makes up about 0.1 wt % to about 10 wt %, preferably about 0.5 to about 5 wt % of the undiluted binder mix solids. The mix is typically diluted and then applied with a curtain coater to a mat. The total concentration of nonvolatile components in the aqueous binder composition (predominantly UF resin and additive solids) also can vary widely in accordance with the practice of the present invention, but it will usually be found convenient and satisfactory to make up this composition at total solids concentration in the range from about 5 to about 40 percent by weight of the total aqueous binder composition. Preferably the total solids are from about 20 to about 35 wt %, more preferably from about 20 wt % to about 30 wt %. As used herein, the solids content of a composition is measured by the weight loss upon heating a small, e.g., 1-5 gram, sample of the composition at about 105° C. for 3 hours.

The binder can be further modified with styrene butadiene rubber for flexibility, with acrylic, vinyl acrylic, polyvinyl alcohol, or other latex for improved tensile strength, flexibilizing amines, or other additives for specialty mat production. The binder composition may also contain a variety of other known additives such as a silica colloid to enhance fire resistance, antifoamers, biocides, pigments, and the like, normally in small proportions relative to the essential UF resin and terpolymer constituents.

The amount of binder applied to the mat also can vary considerably in the broad practice of the present invention, but loadings in the range of about 3 to about 45 percent by weight, preferably about 10 to about 40 percent by weight, and more usually about 15 to about 25 percent by weight, of nonvolatile binder composition based on the dry weight of the bonded mat, will be found advantageous. For inorganic fibrous mats, this value can normally be confirmed by measuring the percent loss on ignition (LOI) of the fiber mat product.

The binder composition of this invention can be employed with any fiber which can be formed into mats in any suitable manner. The fibers may be organic or inorganic, preferably inorganic fibers are used. Inorganic fibers include, but are not limited to, glass fibers, mineral fibers, graphite fibers, metal fibers and metal coated glass or graphite fibers. Asbestos fibers also could be used, but are normally undesirable for health reasons. Organic fibers include, but are not limited to, acrylic, aromatic polyamide, polyester, cellulosic including cellulose, and polyolefin fibers. The fibers generally comprise from about 50 to about 97 percent by weight of solids, in the mat on a dry weight basis. Inorganic fibers are generally preferred.

The binder composition of the invention sets or cures at elevated temperatures below the decomposition temperature of the UF resin and terpolymer components. The setting or curing of the binder composition can occur at temperatures from about 135° C. to about 300° C., preferably from about 135° C. to about 275° C. At these temperatures, the binder composition will typically cure in periods ranging from about 1 to about 60 seconds. Although the binder composition may cure more rapidly at higher temperatures, excessively high temperatures can cause deterioration of the binder composition or the fibers of the mat, which in turn causes a deterioration of the bonded mat physical and functional properties.

The process of forming a fiber mat, and especially a glass fiber mat in accordance with the invention begins with chopped bundles of glass fibers of suitable length and diameter for the intended application. While reference is made hereinafter to using chopped bundles of glass fibers, other fiber types, e.g., mineral fibers and synthetic fibers and other forms of fibers such as continuous strands, may also be used. Generally, fibers having a length of about ¼ inch to 3 inches and a diameter of about 3 to 20 microns are used for most applications. Each bundle may contain from about 20 to 500, or more, of such fibers. Suitable fibers are available commercially from Owens-Corning Fiberglass and Johns Manville.

The glass fiber bundles are added to an aqueous dispersant medium to form an aqueous slurry, known in the art as "white water." The white water typically contains about 0.5% glass fibers. Any viscosity modifier or dispersant, including those commonly used in the past, can be used in the practice of the present invention including hydroxyethyl cellulose, ethoxylated amines, polyacrylamides, amine oxides and the like. Polyacrylamide and amine oxide white water systems have proven to be particularly compatible with the binder composition of the present invention. The amount of viscosity modifier used should be effective to provide the viscosity needed to suspend the glass fibers in the white water as needed to practice the method used to form the wet laid mat. The white water viscosity is generally in the range of 1 to 20 cps, preferably 1.5 to 8 cps. The fiber slurry then is agitated to form a workable, uniform dispersion of glass fibers having a suitable consistency. The viscosity modifier also may contain other conventional additives known in the art. These include dispersion aids, surfactants, lubricants, biocides, defoamers and the like.

The fiber/water dispersion then is passed to a mat-forming machine typically containing a mat forming screen. On route to the screen, the dispersion often is diluted further with water to a lower fiber concentration. The fibers are collected at the screen in the form of a wet fiber mat and excess water is removed by gravity or, more often, by vacuum assist in a conventional manner.

The binder composition of the invention then is applied to the gravity- or vacuum-assisted dewatered wet fiber mat. Application of the binder composition may be accomplished by any conventional means, such as by soaking the mat in an excess of binder solution or suspension, or by coating the mat surface with binder by means of a binder applicator, such as a falling film or curtain coater.

Following application of the aqueous binder composition to the wet laid mat, the glass fiber mat is dewatered, normally under vacuum, to remove excess binder solution. The mat then is dried and the incorporated binder composition is cured in an oven at elevated temperatures, generally at a temperature of at least about 170° C., more typically 200 to 250° C., for a time sufficient to cure the resin. The amount of time needed to cure the resin is readily determinable by the skilled practitioner. Heat treatment alone is sufficient to effect curing. Alternatively, but generally less desirable, catalytic curing in the absence of heat may be used, such as is accomplished upon the addition of an acid catalyst, e.g., ammonium chloride or p-toluene sulfonic acid.

The finished glass mat product generally contains between about 60% and 90% by weight glass fibers and between about 10% and 40% by weight of cured binder, 15-30% of binder being most preferable.

The following examples are intended to be illustrative only and do not limit the scope of the claimed invention.

EXAMPLES

Example 1

A solution polymer by Interpolymer (I-88) was evaluated and compared to a series of SMA-modified controls. Interpolymer I-88 is a styrene/acrylic solution polymer. Two unmodified resins were tested to show how I-88 affects mat properties as a function of resin composition. In this example, Resin A is urea-formaldehyde resin having a F/U mole ratio of 1.7. Resin B is a urea-formaldehyde resin having a F/U mole ratio resin of 2.0. The concentration of the SMA and I-88 additives were varied from 0.5 to 3%.

A handsheet study was performed under the conditions stated in the table below. The binders were prepared by adding the additive to the resin and diluting the blend to approximately 23% solids with DI water. Three handsheets (11×11 inch) were made for each binder system. Each set was tested for dry and wet tensile strength on a Thwing-Albert tensile tester (0-200 kg load cell), Elmendorf tear strength on a Thwing-Albert Pro Tear (3200 g pendulum), and caliper on a Thwing-Albert ProGage. Seven replicates were made for each test, and 95%-confidence intervals were calculated.

| | |
|---|---|
| Glass fiber | OC Advantex, 1-inch |
| White water | PAA |
| Cure conditions | 205° C. |
| Average basis weight | 1.8 lbs/100 sq. ft. |
| Modifiers | SMA & I-88 |
| Average LOI | 23% |
| Resins | Resin A & Resin B |

The average mat tensile strength for the controls were 75 lbs (Resin B+1.0% SMA), 79 lbs (Resin A+2% SMA), and 76 lbs (Resin A+1.5% SMA) while the Resin A+I-88 binders averaged 90 lbs and the Resin B+I-88 binders averaged 92 lbs. Therefore, the I-88 modified binders had a higher tensile strength (+10 lbs) over the SMA-modified resins except for the Resin A+2.2% SMA. The 2.2% level of I-8 was not evaluated; however, 3% was and it had a mat tensile strength of 95 lbs, which is statistically equal to the 2.2% SMA modified system. This increase in tensile strength was observed for both Resin A and B.

All of systems based on Resin A or Resin B had the same mat tear strength regardless of modifier, I-88 or SMA. There was a slight improvement with Resin B; however, the tear strength was the same for both modifiers.

Resin A showed increasing cure with increasing SMA (peaking at 2% SMA) and I-88 (peaking between 1-3%). Resin B showed decreasing cure with increasing amounts of I-88. All systems though were adequately cured (>60%).

Overall, the I-88 modified resins showed improved mat tensile strength and equal mat tear strength to the SMA modified resins.

| Resin | Mod-ifier | % Modifier | Dry Tensile, lbs | % HW | Tear, gf | % LOI | BW, lbs/100 ft$^2$ |
|---|---|---|---|---|---|---|---|
| A | SMA | 1.5% | 76 | 61 | 890 | 26.5 | 1.80 |
| A | SMA | 2.0% | 79 | 70 | 782 | 27.2 | 1.78 |
| A | SMA | 2.2% | 94 | 64 | 838 | 26.2 | 1.80 |
| A | I-88 | 0.5% | 86 | 64 | 794 | 25.1 | 1.79 |
| A | I-88 | 1.0% | 90 | 71 | 853 | 24.4 | 1.79 |
| A | I-88 | 3.0% | 95 | 71 | 854 | 23.0 | 1.79 |
| B | SMA | 1.0% | 75 | 65 | 892 | 25.4 | 1.84 |
| B | I-88 | 0.5% | 85 | 65 | 949 | 24.7 | 2.23 |
| B | I-88 | 1.0% | 95 | 60 | 863 | 23.1 | 1.78 |
| B | I-88 | 3.0% | 97 | 56 | 908 | 24.7 | 1.81 |

Example 2

Two unmodified resins were evaluated to determine how I-88 might affect resins with different mole ratios. In this example, Resin A is urea-formaldehyde resin having a F/U mole ratio of 1.7. Resin C is a urea-formaldehyde resin having a F/U mole ratio resin of 2.0. The concentration of the SMA and I-88 additives were varied from 0.94 to 3%.

A handsheet study was performed under the conditions stated in the table below. The binders were prepared by adding the additive to the resin and diluting the blend to approximately 23% solids with filtered water. Three handsheets (11× 11 inch) were made for each binder system. Each set was tested for dry and wet tensile strength on a Thwing-Albert tensile tester (0-200 kg load cell) and Elmendorf tear strength on a Thwing-Albert Pro Tear (3200 g pendulum). Seven replicates were made for each test, and 95%-confidence intervals were calculated.

TABLE I

Handsheet study conditions

| | |
|---|---|
| Glass fiber | OC 9501 Advantex, 1-inch |
| White water | PAA |
| Cure conditions | 205° C. |
| Average basis weight | 1.80 lbs/100 sq. ft. |
| Modifiers | SMA & I-88 |
| Average LOI | 27% |

Binders made with Resin C had slightly higher mat tear strength when modified with I-88 vs SMA. Binders made with Resin A had equal mat tear strengths regardless of modified (I-88 or SMA).

There is a slight increase in mat tensile strength for the I-88 modified Resin C series vs that modified with SMA. The mat tensile strength is statistically equal for Resin A regardless of the additive type.

Resin A showed increasing cure with increasing amounts of I-88. As the concentration of I-88 increased within Resin C, the % hot-wet retention decreased at the same cure time; thus suggesting a slower curing system.

Based on this study, the I-88 additive appears to be a better modifier for the Resin C resin as indicated by the improved mat tear and tensile strengths. The properties for Resin A are the same regardless of the additive type.

| Resin | % Modifier | Modifier | Dry Tensile, lbs | % HW | Tear, gf | % LOI | BW, lbs/100 ft$^2$ | Caliper, mils |
|---|---|---|---|---|---|---|---|---|
| C | 0.94% | SMA | 98 | 58 | 792 | 26.7 | 1.82 | 34.1 |
| C | 0.94% | I-88 | 82 | 62 | 830 | 24.9 | 1.84 | 36.2 |
| C | 1.90% | I-88 | 100 | 54 | 870 | 29.1 | 1.84 | 37.6 |
| C | 2.00% | SMA | 98 | 62 | 747 | 23.4 | 1.78 | 33.5 |
| C | 2.40% | SMA | 81 | 68 | 888 | 28.2 | 1.85 | 35.7 |
| C | 2.00% | SMA | 103 | 68 | 806 | 32.5 | 1.92 | 37.0 |
| C | 2.89% | I-88 | 117 | 43 | 1003 | 28.0 | 1.91 | 36.4 |
| A | 1.00% | I-88 | 82 | 72 | 793 | 27.0 | 1.80 | 36.7 |
| A | 2.00% | I-88 | 68 | 80 | 733 | 23.8 | 1.79 | 36.3 |
| A | 2.00% | I-88 | 102 | 49 | 749 | 31.6 | 1.82 | 38.4 |
| A | 2.00% | SMA | 111 | 56 | 926 | 25.5 | 1.79 | 35.8 |
| A | 2.50% | SMA | 79 | 70 | 732 | 26.7 | 1.83 | 37.1 |
| A | 3.00% | I-88 | 86 | 73 | 823 | 25.5 | 1.80 | 38.9 |

Example 3

In this example, Resin A is a urea-formaldehyde resin having a F/U mole ratio of 1.8. Resin D is a urea-formaldehyde resin having a F/U mole ratio of 2.0. Resin E is another urea-formaldehyde resin having a F/U mole ratio of 2.0 with higher final solids.

A handsheet study was performed under the conditions stated in the table below. Binders were prepared by adding the additive to the resin and diluting the blend to approximately 23% solids with filtered water. Three handsheets (11×11 inch) were made for each binder system. Each set was tested for dry and wet tensile strength on a Thwing-Albert tensile tester (0-200 kg load cell) and Elmendorf tear strength on a Thwing-Albert Pro Tear (3200 g pendulum). Seven replicates were made for each test, and 95%-confidence intervals were calculated.

| | |
|---|---|
| Glass fiber | OC Advantix 9501, 1-inch |
| White water | PAA |
| Cure conditions | 205° C. |
| Average basis weight | 1.7 lbs/100 sq. ft. |
| Average LOI | 22% |

All the binders evaluated were adequately cured at 205° C.

As SMA or I-88 increased, the % hot-wet retention increased. Overall, the SMA modified binders had a % hot-wet retention slightly higher than the I-88 modified binders.

As SMA or I-88 increased from 1.5% to 2.0% with Resin A, there was no change in dry tensile.

The binders based on Resin A and I-88 had a slightly higher tensile strength compared to the same resin modified with SMA (+10 lbs). SMA modified Resin E (2%) has an equal tensile strength to the I-88 modified Resin A.

All of the binders had equal mat tear strengths regardless of additives or resin.

| Resin | Modifier | % Modifier | Dry Tensile, lbs | % HW | Tear, gf | % LOI | BW, lbs/100 ft$^2$ |
|---|---|---|---|---|---|---|---|
| A | I-88 | 1.5% | 80 | 56 | 782 | 19.2 | 1.63 |
| | | | 98 | 55 | 880 | 22.4 | 1.71 |
| A | I-88 | 2.0% | 87 | 67 | 821 | 23.5 | 1.72 |
| | | | 92 | 65 | 870 | 24.1 | 1.78 |
| A | SMA | 1.5% | 77 | 50 | 853 | 24.3 | 1.77 |
| | | | 83 | 67 | 964 | 24.5 | 1.76 |

-continued

| Resin | Modifier | % Modifier | Dry Tensile, lbs | % HW | Tear, gf | % LOI | BW, lbs/100 ft$^2$ |
|---|---|---|---|---|---|---|---|
| A | SMA | 2.0% | 89 | 73 | 785 | 25.3 | 1.73 |
| | | | 69 | 87 | 816 | 20.4 | 1.73 |
| E | SMA | 2.0% | 88 | 72 | 951 | 23.7 | 1.78 |
| | | | 83 | 69 | 869 | 19.4 | 1.71 |

Example 4

In this example, Resin A is a urea-formaldehyde resin having a F/U mole ratio of 1.8.

A series of modified UF resins designed to improve mat tensile strength were evaluated.

| # | Resin | % Additive | Additive |
|---|---|---|---|
| 1 | A | 1.5% | SMA |
| 2 | A | 2.0% | SMA |
| 3 | A | 1.5% + 0.5% | SMA/I-88 |
| 4 | A | 1.5% | I-88 |
| 5 | A | 2.5% | SMA |
| 6 | A | 2.0% | I-88 |

The handsheets were made under the conditions stated in the table below. The pre-blends were diluted 20% solids with white water. Three handsheets (11×11 inch) were made for each binder condition. Each set was tested for dry and wet tensile strength on a Thwing-Albert tensile tester (0-200 kg load cell), for Elmendorf tear strength on a Thwing-Albert Pro Tear (3200 g pendulum), and for caliper on a Thwing-Albert ProGage. Seven replicates were made for each test, and 95%-confidence intervals were calculated

| | |
|---|---|
| Glass fiber | OC Advantix, 1.25-inch |
| White water | PAA |
| Cure conditions | 180° C. |
| Average basis weight | 1.9 lbs/100 sq. ft. |
| Average LOI | 20% |

Based on these findings, it is determined that many of the modified binders had a higher tensile strength than the Resin A modified with the lowest level of SMA (1.5%). As the concentration of the SMA was increased from 1.5 to 2.5%, the dry tensile strength increased. As the I-88 concentration was increased from 1.5 to 2.0%, the dry tensile strength remained constant. Overall, the I-88 modified resins had a slightly higher mat dry tensile strength than the same resin modified with an equal concentration of SMA.

Due to the variation in % hot-wet retention, LOI and basis weight, a equalized tensile number (ETN) was calculated to more closely look for data trends. Now, the increase in tensile strength with SMA concentration is more distinct and there is a benefit of adding the I-88 additive to the system already containing SMA. With SMA alone, the ETN is only 111 for the 1.5% SMA modified resin. Upon addition of only 0.5% I-88, the ETN increased to 150.

The ETN for the resins containing I-88 increased as the concentration increased form 1.5 to 2.0%. There is still a slightly improvement in ETN for the I-88 modified systems over the those modified with equal levels of SMA.

$$ETN = \frac{(\text{dry tensile} * \% \text{ hot wet})}{(LOI * \text{basis weight})}$$

All of the resin additive combinations yielded mat with equal tear strength. Resin A+2.0% I-88 had a balanced performance, i.e., slightly improved mat tensile strength (~15%) and maintained mat tear strength. The % hot-wet retention remained relatively constant for all the binder additive combinations.

| Mix # | Dry Tensile, lbs | Tear, gf | Caliper, mls | % HW | BW, lbs/100 ft² | % LOI | ETN |
|---|---|---|---|---|---|---|---|
| 1 | 71 | 1163 | 41.5 | 58 | 1.88 | 19.7 | 111 |
| 2 | 75 | 1179 | 40.6 | 66 | 1.84 | 20.6 | 131 |
| 3 | 74 | 1089 | 41.2 | 78 | 1.88 | 20.4 | 150 |
| 4 | 84 | 1263 | 42.2 | 56 | 1.89 | 20.8 | 120 |
| 5 | 81 | 1179 | 39.9 | 64 | 1.84 | 17.8 | 159 |
| 6 | 82 | 1206 | 40.9 | 60 | 1.83 | 18 | 150 |

Example 5

In this example, Resin A is a urea-formaldehyde resin having a F/U mole ratio of 1.8. Resin E is a urea-formaldehyde resin having a F/U mole ratio of 1.8 and a slightly higher molecular weight.

The handsheets were made under the conditions stated in the table below. The pre-blends were diluted approximately 25% solids with process white water immediately prior to the study. Three handsheets (11×11 inch) were made for each binder condition. Each set was tested for dry and wet tensile strength on a Thwing-Albert tensile tester (0-200 kg load cell), for Elmendorf tear strength on a Thwing-Albert Pro (3200 g pendulum), and for caliper on a Thwing-Albert Pro-Gage. Seven replicates were made for each test, and 95%-confidence intervals were calculated.

| | |
|---|---|
| Glass fiber | OC Advantix 1.25-inch |
| White water | PAA |
| Cure conditions | 180° C. |
| Average basis weight | 2.1 lbs/100 ft² |
| Average LOI | 26% |

All of the systems were adequately cured at 180° C. based on the % hot-wet retentions being approximately the same and greater than 60%.

Due to the slight variation in basis weight, LOI, and hot-wet retention, the equalized tensile number (ETN) was plotted for each binder to try to discern any difference among the binders.

$$ETN = \frac{(\text{dry tensile} * \% \text{ hot wet})}{(LOI * \text{basis weight})}$$

Resin A+1.5% I-88 (109) and Resin E+2.0% SMA (120) had an ETN greater than Resin A with only 1.5% SMA modification (87).

All the binders yielded mat with greater than 350 gf tear strength. The resin E+2.0% SMA (500 gf) binder had the highest mat tear strength of all the binders evaluated. There was no statistical difference in mat tear strength for the 2 binders modified with 1.5% I-88 or SMA.

| Resin | Additive | % Additive | Dry Tensile, lbs | % HW | Tear, gf | % LOI | BW, lbs/100 ft² | ETN |
|---|---|---|---|---|---|---|---|---|
| A | SMA | 1.5% | 85 | 61 | 388 | 28.3 | 2.06 | 77.7 |
| A | I-88 | 1.5% | 94 | 64 | 429 | 26.0 | 2.07 | 109.4 |
| E | SMA | 2.0% | 85 | 73 | 500 | 26.4 | 2.06 | 120.1 |

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A fiber mat comprising fibers bound together with a cured binder composition, wherein the binder composition, prior to curing, comprises an aqueous binder composition comprising:
as a major component, a thermosetting urea-formaldehyde resin, and
as a minor component, a water-soluble additive comprising:
at least one styrene/acrylate solution bi-modal polymer comprising a first molecular weight species having a molecular weight of 1,000 daltons to 100,000 daltons and a second molecular weight species having a molecular weight greater than 100,000 daltons.

2. The fiber mat of claim 1, wherein the aqueous binder composition comprises about 0.1 wt % to about 10 wt % solids of the styrene/acrylate solution bi-modal polymer, based on total binder solids.

3. The fiber mat of claim 1, wherein the fibers are selected from the group consisting of glass fibers, mineral fibers, graphite fibers, metal fibers, metal coated glass fibers, metal coated graphite fibers, acrylic fibers, aromatic polyamide fibers, polyester fibers, cellulosic fibers, and polyolefin fibers.

4. The fiber mat of claim 1, wherein the fiber mat contains about 60 wt % to about 90 wt % of the fibers and about 10 wt % to about 40 wt % of the cured binder composition, based on a dry weight of the fiber mat.

5. The fiber mat of claim 4, wherein the fiber mat contains about 15 wt % to about 25 wt % of the cured binder composition, based on a dry weight of the fiber mat.

6. A method for making a fiber mat, comprising:
dispersing fibers in an aqueous medium to form a slurry;
forming the slurry into a wet fiber mat;
applying an aqueous binder composition to the wet fiber mat, wherein the aqueous binder composition comprises as a major component a thermosetting urea-formaldehyde resin and as a minor component a water-soluble additive containing at least one styrene/acrylate solution bi-modal polymer comprising a first molecular weight species having a molecular weight of 1,000 daltons to 100,000 daltons and a second molecular weight species having a molecular weight greater than 100,000 daltons, wherein the styrene/acrylate solution bimodal polymer is present in the aqueous binder composition in an amount of about 0.1 wt % to about 10 wt %, based on total binder solids, and
curing the binder composition at an elevated temperature of about 135° C. to about 300° C. to provide a fiber mat comprising fibers bound together with the cured binder composition.

7. The fiber mat of claim 1, wherein a ratio of the first molecular weight species to the second molecular weight species is from about 95:5 to about 5:95.

8. The fiber mat of claim 1, wherein a ratio of the first molecular weight species to the second molecular weight species is from 50:50 to 70:30.

9. The fiber mat of claim 1, wherein a ratio of the first molecular weight species to the second molecular weight species is about 60:40.

10. The fiber mat of claim 1, wherein the first molecular weight species has a molecular weight of 3,000 daltons to 7,000 daltons and the second molecular weight species has a molecular weight greater than 100,000 daltons to 3,000,000 daltons.

11. The fiber mat of claim 1, wherein the first molecular weight species has a molecular weight of 3,000 daltons to 7,000 daltons, the second molecular weight species has a molecular weight greater than 100,000 daltons to 3,000,000 daltons, and a ratio of the first molecular weight species to the second molecular weight species is from 50:50 to 70:30.

12. The fiber mat of claim 1, wherein the first molecular weight species has a molecular weight of 3,000 daltons to 7,000 daltons, the second molecular weight species has a molecular weight greater than 100,000 daltons to 3,000,000 daltons, a ratio of the first molecular weight species to the second molecular weight species is from 50:50 to 70:30, and the aqueous binder composition comprises about 0.1 wt % to about 10 wt % solids of the styrene/acrylate solution bi-modal polymer, based on total binder solids.

13. The fiber mat of claim 1, wherein the first molecular weight species has a molecular weight of 3,000 daltons to 7,000 daltons, the second molecular weight species has a molecular weight greater than 100,000 daltons to 3,000,000 daltons, a ratio of the first molecular weight species to the second molecular weight species is from 50:50 to 70:30, and the aqueous binder composition comprises about 0.1 wt % to about 5 wt % solids of the styrene/acrylate solution bi-modal polymer, based on total binder solids.

14. The fiber mat of claim 1, wherein the first molecular weight species has a molecular weight of 3,000 daltons to 7,000 daltons, the second molecular weight species has a molecular weight greater than 100,000 daltons to 3,000,000 daltons, a ratio of the first molecular weight species to the second molecular weight species is from 50:50 to 70:30, and the aqueous binder composition comprises about 0.1 wt % to about 3 wt % solids of the styrene/acrylate solution bi-modal polymer, based on total binder solids.

15. The fiber mat of claim 1, wherein the first molecular weight species has a molecular weight of 3,000 daltons to 7,000 daltons, the second molecular weight species has a molecular weight greater than 100,000 daltons to 3,000,000 daltons, a ratio of the first molecular weight species to the second molecular weight species is about 60:40, and the aqueous binder composition comprises about 0.1 wt % to about 3 wt % solids of the styrene/acrylate solution bi-modal polymer, based on total binder solids.

16. The fiber mat of claim 1, wherein the styrene/acrylate solution bi-modal polymer comprises an acrylate of the formula:

$$CH_2=CR_1COOR_2 \text{ or}$$

$$CH_2=CR_1CONR_3R_4$$

wherein:
  each $R_1$ is independently hydrogen or —$CH_3$,
  $R_2$ is hydrogen or an optionally substituted ester moiety, and
  $R_3$ and $R_4$ are each independently hydrogen, an alkyl, or an alkanol.

17. The fiber mat of claim 1, wherein the acrylate is methyl methacrylate.

18. The method of claim 6, wherein a ratio of the first molecular weight species to the second molecular weight species is from about 95:5 to about 5:95.

19. The method of claim 6, wherein a ratio of the first molecular weight species to the second molecular weight species is from 50:50 to 70:30.

20. The method of claim 6, wherein a ratio of the first molecular weight species to the second molecular weight species is about 60:40.

21. The method of claim 6, wherein the first molecular weight species has a molecular weight of 3,000 daltons to 7,000 daltons and the second molecular weight species has a molecular weight greater than 100,000 daltons to 3,000,000 daltons.

22. The method of claim 6, wherein the first molecular weight species has a molecular weight of 3,000 daltons to 7,000 daltons, the second molecular weight species has a molecular weight greater than 100,000 daltons to 3,000,000 daltons, and a ratio of the first molecular weight species to the second molecular weight species is from 50:50 to 70:30.

23. The method of claim 6, wherein the first molecular weight species has a molecular weight of 3,000 daltons to 7,000 daltons, the second molecular weight species has a molecular weight greater than 100,000 daltons to 3,000,000 daltons, a ratio of the first molecular weight species to the second molecular weight species is from 50:50 to 70:30, and the aqueous binder composition comprises about 0.1 wt % to about 10 wt % solids of the styrene/acrylate solution bi-modal polymer, based on total binder solids.

24. The method of claim 6, wherein the first molecular weight species has a molecular weight of 3,000 daltons to 7,000 daltons, the second molecular weight species has a molecular weight greater than 100,000 daltons to 3,000,000 daltons, a ratio of the first molecular weight species to the second molecular weight species is from 50:50 to 70:30, and the aqueous binder composition comprises about 0.1 wt % to about 5 wt % solids of the styrene/acrylate solution bi-modal polymer, based on total binder solids.

25. The method of claim 6, wherein the first molecular weight species has a molecular weight of 3,000 daltons to 7,000 daltons, the second molecular weight species has a molecular weight greater than 100,000 daltons to 3,000,000 daltons, a ratio of the first molecular weight species to the second molecular weight species is from 50:50 to 70:30, and the aqueous binder composition comprises about 0.1 wt % to about 3 wt % solids of the styrene/acrylate solution bi-modal polymer, based on total binder solids.

26. The method of claim 6, wherein the first molecular weight species has a molecular weight of 3,000 daltons to 7,000 daltons, the second molecular weight species has a molecular weight greater than 100,000 daltons to 3,000,000 daltons, a ratio of the first molecular weight species to the second molecular weight species is about 60:40, and the aqueous binder composition comprises about 0.1 wt % to about 3 wt % solids of the styrene/acrylate solution bi-modal polymer, based on total binder solids.

27. The method of claim 6, wherein the styrene/acrylate solution bi-modal polymer comprises an acrylate of the formula:

$$CH_2=CR_1COOR_2 \text{ or}$$

$$CH_2=CR_1CONR_3R_4$$

wherein:
  each $R_1$ is independently hydrogen or —$CH_3$,
  $R_2$ is hydrogen or an optionally substituted ester moiety, and
  $R_3$ and $R_4$ are each independently hydrogen, an alkyl, or an alkanol.

* * * * *